United States Patent
Wagner et al.

(10) Patent No.: US 6,973,767 B2
(45) Date of Patent: Dec. 13, 2005

(54) BEVERAGE BOTTLING PLANT AND A CONVEYOR ARRANGEMENT FOR TRANSPORTING PACKAGES

(75) Inventors: Stefan Wagner, Xanten (DE); Hans-Peter Kuhlmann, Xanten (DE); Hans-Gerd Ripkens, Goch (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 0 days.

(21) Appl. No.: 10/756,171

(22) Filed: Jan. 13, 2004

(65) Prior Publication Data

US 2004/0200190 A1  Oct. 14, 2004

(30) Foreign Application Priority Data

Jan. 15, 2003 (DE) ................. 103 01 178

(51) Int. Cl.[7] ............................................. B65B 35/30
(52) U.S. Cl. .................... 53/544; 53/173; 53/266.1; 53/282; 53/287; 198/377.02; 198/373; 198/379; 198/417; 198/804; 198/678.1
(58) Field of Search ................ 53/173, 266.1, 53/282, 287, 544; 198/377.01, 377.03, 373, 198/379, 681, 415–417, 377.02, 685–687, 198/817, 837, 678.1, 836.1

(56) References Cited

U.S. PATENT DOCUMENTS

| 3,580,379 | A | * | 5/1971 | Shuster et al. ............... 198/401 |
| 3,677,389 | A | * | 7/1972 | Benatar et al. ........ 198/377.02 |
| 4,098,391 | A | * | 7/1978 | Hernandez ................... 198/417 |
| 4,411,350 | A | * | 10/1983 | Wolfram .................... 193/35 A |
| 4,458,801 | A | * | 7/1984 | Nichols ........................ 193/46 |
| 4,492,299 | A | * | 1/1985 | McLeod ...................... 198/417 |
| 4,901,842 | A | * | 2/1990 | Lemboke et al. ........... 198/415 |
| 5,074,400 | A | * | 12/1991 | Focke et al. ................ 198/415 |
| 5,609,237 | A | * | 3/1997 | Lenhart ...................... 198/406 |
| 5,701,726 | A | * | 12/1997 | Smith .......................... 53/544 |
| 5,860,646 | A | * | 1/1999 | Fowler et al. .............. 271/185 |
| 6,688,456 | B2 | * | 2/2004 | Jones et al. ................. 198/415 |

* cited by examiner

*Primary Examiner*—Stephen F. Gerrity
*Assistant Examiner*—Hemant M. Desai
(74) *Attorney, Agent, or Firm*—Nils H. Ljungman & Associates

(57) ABSTRACT

There is now provided a beverage bottling plant for filling bottles and like containers with a liquid beverage filling material and a conveyer arrangement for aligning and distributing packages containing filled bottles and like containers. The conveyer arrangement permits rotation of a package upon traveling from the conveyer input to the conveyer output.

11 Claims, 7 Drawing Sheets

FIG. 3
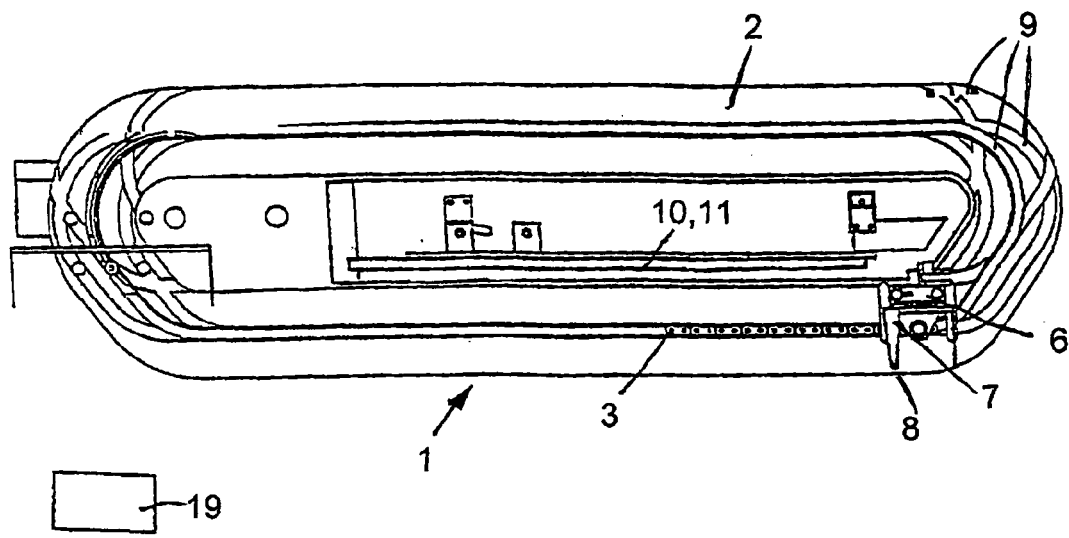
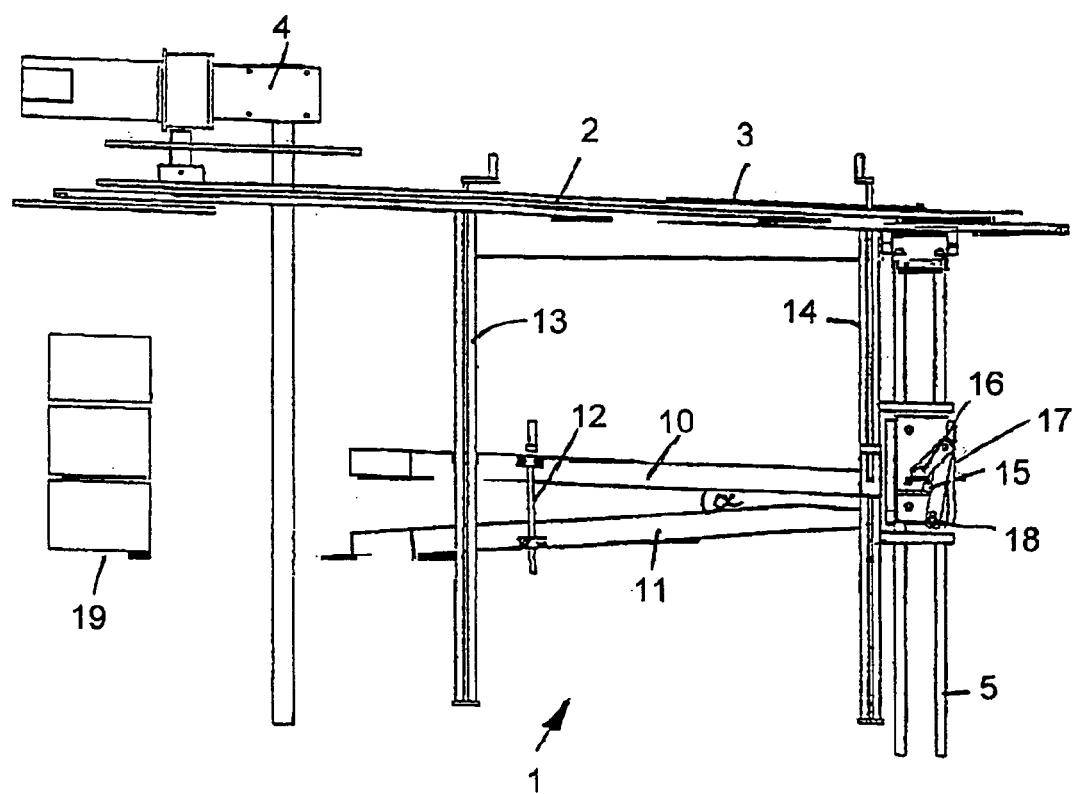
FIG. 2

BEVERAGE BOTTLING PLANT AND A CONVEYOR ARRANGEMENT FOR TRANSPORTING PACKAGES

BACKGROUND OF THE INVENTION

1. Field of the Invention

The invention relates to a beverage bottling plant for filling bottles and like containers with a liquid beverage filling material and a conveyer arrangement for aligning and distributing packages containing filled bottles and like containers.

2. Background Information

Beverage bottling plants for filling bottles with a liquid beverage filling material are known.

Such bottling plants can possibly comprise a beverage filling machine with a plurality of beverage filling positions, each beverage filling position having a beverage filling device for filling bottles with liquid beverage filling material. The filling devices may have apparatus being configured to introduce a predetermined flow of liquid beverage filling material into the interior of bottles to a substantially predetermined level of liquid beverage filling material, and the apparatus configured to introduce a predetermined flow of liquid beverage filling material comprising apparatus being configured to terminate the filling of beverage bottles upon liquid beverage filling material reaching said substantially predetermined level in bottles. There may also be provided a conveyer arrangement being configured and disposed to move bottles, for example, from an inspection machine to the filling machine. Upon filling, a closing station closes filled bottles. There may further be provided a conveyer arrangement configured to transfer filled bottles from the filling machine to the closing station; as well as a loading station that is configured to load filled bottles into containers, for example, in a six-pack arrangement. There may also be provided a conveyor arrangement configured to transfer filled bottles from the closing station to the loading station.

Such six-pack containers or packages may require a conveyer arrangement for aligning and distributing, which conveyer arrangement may be positioned next in succession, for example, to a packaging machine that gathers cans, bottles, etc. into bundles, and this package bundle is delivered to further processing stations and/or palletizing arrangements, packaging being, for example, in cardboard boxes.

For this, it is required that the packages are delivered with a defined orientation, such as, for example, in the longitudinal direction or, for example, rotated by ninety degrees, as well as in a predetermined distribution, such as, for example, in a single-file arrangement or in double-file arrangement, to such further stations.

Hitherto, this was carried out with two arrangements, with the required rotation being carried out in one arrangement, and the corresponding distribution is carried out in the other arrangement.

OBJECTS OF THE INVENTION

One object of the present invention described below is to solve the problems encountered on similar apparatus of the prior art.

It is also the aim and objective of the present invention to configure an arrangement of the type mentioned in the foregoing in such a way that orientation and distribution can be carried out simultaneously and a compact structure of the arrangement is made possible.

SUMMARY OF THE INVENTION

The invention teaches in one aspect that these objects can be accomplished by a beverage bottling plant for filling bottles with a liquid beverage filling material, said beverage bottling plant comprising: a beverage filling machine comprising a plurality of beverage filling positions, each beverage filling position comprising a beverage filling device for filling bottles with liquid beverage filling material; said filling devices comprising apparatus being configured to introduce a predetermined flow of liquid beverage filling material into the interior of bottles to a substantially predetermined level of liquid beverage filling material; said apparatus configured to introduce a predetermined flow of liquid beverage filling material comprising apparatus being configured to terminate the filling of beverage bottles upon liquid beverage filling material reaching said substantially predetermined level in bottles; a first conveyer arrangement being configured and disposed to move bottles to said beverage filling machine; a closing station being configured to close filled bottles; a second conveyer arrangement being configured and disposed to transfer filled bottles from said filling machine to said closing station; a loading station being configured to load filled bottles into containers; a third conveyor arrangement being configured and disposed to transfer filled bottles from said closing station to said loading station; a fourth conveyer arrangement being configured and disposed to remove containers containing filled bottles from said loading station; said fourth conveyer arrangement comprising: a conveyer input and a conveyer output; a conveyer frame; a chain being configured and disposed to cycle in said frame between said conveyer input and said conveyer output; a first guide rod, a second guide rod, and a third guide rod, all being connected to said chain; a first sled structure being connected to said chain by said first guide rod at a first location and being configured to travel with said chain and also being configured to move along said first guide rod; a second sled structure being connected to said chain by said second guide rod at a second location and being configured to travel with said chain anteriorly of said first sled structure and also being configured to move along said second guide rod; a third sled structure being connected to said chain by said third guide rod at a third location and being configured to travel with said chain anteriorly of said second sled structure and also being configured to move along said third guide rod; each sled structure comprising: a guide box structure being configured to receive and at least partially to surround a container containing filled bottles at said conveyer input and being configured to deposit a container containing filled bottles at said conveyer output; a first guide pin being connected to said guide box structure; a toggle-lever arrangement; said toggle-lever arrangement comprising: a linkage pin being connected to said guide box structure; said linkage pin having an axis of rotation; said guide box structure being configured to rotate about said axis of rotation of said linkage pin; a first lever having a first end and a second end remote from said first end of said first lever;

said first end of said first lever being connected to said linkage pin and being configured to rotate said linkage pin about said longitudinal axis of said linkage pin and thus to effectuate rotation of said guide box structure and a container containing filled bottles; a second lever being configured and disposed to actuate said first lever for the rotation of said guide box structure; said second lever having a first end and a second end remote from said first end; said first end of said second lever being connected to said second end of said first lever; said second lever having a guide pin connected to said second end of said second lever; said first guide pin and said guide pin of said second lever being configured to be disposed in a first position, at a first distance from one another, adjacent said conveyer input; and said first guide pin and said guide pin of said second lever being configured to be disposed at a second position, at a second distance from one another, adjacent said conveyer output; said second distance being greater than said first distance and of sufficient length to effectuate the rotation of said guide box structure and a container containing filled bottles upon said first lever being actuated by said second lever; and said toggle-lever arrangement further comprising: a reset arrangement being configured and disposed to reposition said first guide pin and said guide pin of said second lever of said toggle-lever arrangement from the second position at said conveyer output to the first position at said conveyer input; said fourth conveyer arrangement further comprising: a first pair of guide rails being configured and disposed to guide said first sled structure and a first container containing filled bottles to a first location; a second pair of guide rails being disposed adjacent said first pair of guide rails and being configured and disposed to guide said second sled structure and a second container containing filled bottles to a second location adjacent said first location; a third pair of guide rails being disposed adjacent said second pair of guide rails and being configured and disposed to guide said third sled structure and a third container containing filled bottles to a third location adjacent said second location; each pair of guide rails being disposed stationary in reference to said conveyer frame and each pair of guide rails comprising: a first guide rail having a guide groove to guide said first guide pin; and a second guide rail having a guide groove to guide said guide pin of said second lever of a toggle-lever arrangement; each guide rail comprising an input end disposed adjacent said conveyer input; each guide rail comprising an output end disposed adjacent said conveyer output; each first guide rail being configured to guide the first guide pin of the corresponding sled structure in the corresponding first guide rail guide groove; each second guide rail being configured to guide the guide pin of the second lever of the corresponding toggle-lever arrangement of the corresponding sled structure in said second guide rail guide groove in the corresponding first guide rail guide groove; each pair of guide rails thus being configured to guide the corresponding guide box structure and a container containing filled bottles from said conveyer input to a location at said conveyer output; each pair of guide rails further comprising: a first apparatus being configured and disposed to position said first guide rail and said second guide rail in a first position with respect to one another and also in a second position with respect to one another: wherein in said first position said first guide rail and said second guide rail are disposed parallel with respect to one another to permit movement of a guide box structure and a package containing filled bottles without rotation from said conveyer input to said conveyer output; and wherein in said second position said first guide rail and said second guide rail are positioned at a predetermined angle with respect to one another and thus to dispose the input ends of each pair of guide rails with respect to one another at the first distance between the first guide pin and the guide pin of the second lever of the corresponding toggle-lever arrangement and also to dispose the output ends of each pair of guide rails with respect to one another at the second distance between the first guide pin and the guide pin of the second lever of the corresponding toggle-lever arrangement; said angle between each pair of guide rails, the first guide pin of the corresponding sled structure, and the guide pin of the second lever of the corresponding toggle-lever arrangement of the corresponding sled structure being configured to effectuate the rotating of the guide box structure and a container containing filled bottles upon transport of the corresponding sled structure and a container containing filled bottles from said conveyer input to said conveyer output; and each pair of guide rails yet further comprising: a second apparatus being configured and disposed to position the output ends of a pair of guide rails at a predetermined distance with reference to said conveyer chain.

The invention also teaches that the objects can be accomplished by a container filling plant conveyer arrangement configured to transport packages containing a plurality of containers, such as, bottles and cans, said conveyer arrangement comprising: a conveyer input and a conveyer output; a conveyer frame; a plurality of conveying devices being configured and disposed to cycle in said conveyer frame between said conveyer input and said conveyer output; a plurality of guide rods; each of said guide rods being connected to said conveying devices and being configured to travel with said conveying devices; a plurality of sled structures; each of said sled structures being configured to move along the corresponding guide rod; each of said sled structures comprising: a guide box structure being configured to receive a package at said conveyer input and being configured to deposit a package at said conveyer output; an arrangement being configured and disposed to rotate said guide box structure; said conveyer arrangement further comprising: a plurality of pairs of guide rails being disposed stationary with respect to said conveyer frame and being configured to guide one of said plurality of guide box structures and a package held by the corresponding guide box structure from said conveyer input to said conveyer output and to deposit packages adjacent one another in a row transverse to said conveyer frame at said conveyer output; each of said pairs of guide rails comprising: a first guide rail and a second guide rail; and apparatus being configured and disposed to position said first guide rail and said second guide rail in a first position with respect to one another and also in a second position with respect to one another: wherein in said first position said first guide rail and said second guide rail are disposed parallel with respect to one another to permit movement of one of said plurality of guide box structures and a package held by the corresponding guide box structure without being rotated by said rotating arrangement upon movement of the corresponding guide box structure and a package from said conveyer input to said conveyer output; and wherein in said second position said first guide rail and said second guide rail are disposed at an angle with respect to one another to permit rotating of one of said plurality of guide box structures and a package held by the corresponding guide box structure by said rotating arrangement upon movement of the corresponding guide box structure and a package from said conveyer input to said conveyer output.

The invention further teaches that the foregoing objects can be accomplished by a container filling plant conveyer arrangement configured to transport packages containing a plurality of containers, such as, bottles and cans, said conveyer arrangement comprising: a conveyer input and a conveyer output; a conveyer frame; a conveying device being configured and disposed to cycle in said conveyer frame between said conveyer input and said conveyer output; a plurality of guides; each of said guides being connected to said conveying device and being configured to travel with said conveying device; a plurality of package guiding structures connected to said conveying device and being configured to receive a package at said conveyer input and being configured to deposit a package at said conveyer output; each package guiding structure comprising: an arrangement being configured and disposed to rotate said package guiding structure; and a guide arrangement being configured and disposed to guide a corresponding one of said plurality of package guiding structures and a package held by the package guiding structure from said conveyer input to said conveyer output and to deposit packages adjacent to one another in a row transverse to said conveyer frame at said conveyer output; said guide arrangement also being configured and disposed to permit movement of one of said plurality of package guiding structures and a package held by the package guiding structure without being rotated by said rotating arrangement upon movement of the package guiding structure and a package from said conveyer input to said conveyer output; and said guide arrangement further being configured and disposed to permit movement of one of said plurality of package guiding structures and a package held by the package guiding structure and being rotated by said rotating arrangement upon movement of the package guiding structure and a package from said conveyer input to said conveyer output.

Also, the invention teaches a plurality of carrier rods that are connected to conveying elements that are continuously circulating in frames disposed laterally along the delivered items, at which carrier rods is disposed and journalled, for rotation about a vertical axis, respectively at least one gripper element that can be moved in sliding motion along the carrier rod by means of a sled structure, which gripper element is guided in guide rails that are disposed stationary in relation to the conveyer element frame, with provision that the guide rails can be brought from a position in which they are disposed parallel with respect to one another, into an opened position in which they are disposed at an acute angle with respect to one another, and together they can be swung in a direction transversely with respect to the transport direction about the apex of this angle.

With this, the spreading of the guide rails causes the rotation of the gripper, and with the swinging movement of the two guide rails, as a unit or together, the distribution of the packages to the left or to the right is effectuated.

In the event that the guide rails are disposed parallel with respect to one another, the gripper and, accordingly, the package is not rotated.

By means of the arrangement in accordance with one aspect of the invention, with which it is possible to achieve within in a short distance rotation, that is optional, as well as distribution all options namely, rotation and distribution, only rotation, only distribution, can be realized in a simple manner.

The carrier rods, at which the grippers are located, as a rule one gripper is disposed at one carrier rod, are advantageously, in accordance with the claims, connected to chains, such chains comprising the conveying elements mentioned in the claims.

These carrier rods, in accordance with the claims, are guided in guides that are disposed in the conveyer element frames, in such a way that the carrier rods and, accordingly, the gripper elements disposed at the carrier rods, are always disposed with the same orientation and parallel with reference to the conveying plane.

Advantageously, this is carried out thereby that at the ends of the carrier rods there are arranged guide pins that are disposed in offset relationship with respect to one another, these guide pins being guided in corresponding guides in the conveyer element frames, in such a way that this horizontally offset arrangement can always be maintained.

By being guided in this manner, the gripper reaches, in the feed-in region of the packages, from an upper inclined position, with its gripper fingers the respective package, with the packages being received, accordingly, in positive manner. On the further course, by way of the present position of the guide rails, the gripper is moved in a straight line, with a rotation being carried out, for example, through ninety degrees. However, the guide rails can also be disposed in such a way that the package that has been received is only distributed laterally, without a rotation being carried out. As a third possibility it is, of course, provided that both steps, a lateral distribution, as well as also a rotation, take place.

The claims also suggest a structurally simple possibility, as to the manner in which the rotation process can be carried out in a predetermined, controlled, manner.

It is suggested, that the gripper element is guided by way of a lever system, of which one end is guided in the one guide rail and the other end is linked to the gripper element, and in the other guide rail there is guided a guide pin that is positively connected to the sled structure; this being rotatable through an angle between zero degree and more than ninety degrees in conformity with the angle of opening of the guide rails.

When the carrier rod or, respectively, the gripper disposed at the carrier rod, reaches the feed-in region of the arrangement, i.e., into the feed-in or input region of the two guide rails, the guided elements, on the one hand, the guide pin at the end of the lever system and, on the other hand, the guide pin at the sled structure, reach into the corresponding guide rail. In the case that the pair of guide rails have an angle of opening that is greater than zero degree, the two guide pins are moved, during transport, with respect to one another in the sense that they are moved apart, with the lever imparting torque to the gripper and, in conformity with the angle of opening, a rotation of from zero degree to more than ninety degrees is effectuated.

The term "more than ninety degrees" is to indicate that an angle of rotation of exactly ninety degrees is not necessarily always desired.

For further conveying of the distributed and orientated packages, there are available a number of choices, including so-called curved continuous conveyers. In the case that the packages are transported on such curved continuous conveyers, the initially desired orientation is generally somewhat in misalignment. In order to alleviate this condition, the packages are controlled during orientation with an angle, which can be smaller or greater than ninety degrees, so as to compensate the "subsequent misalignment."

Particularly simple has been found to configure this system of levers as thrust crank system.

For adjusting the angle of opening of the guide rails for the gripper elements, in accordance with the claims, there is provided a transmission, that, in accordance with the claims, in a preferred embodiment, comprises a spindle-and-spindle-nut transmission, with, in accordance with the claims, this transmission being manually actuatable, or, however, in accordance with the claims, being actuatable by a stepper or stepping motor.

In the same manner, the swinging movement, as a unit, of the pair of guide rails is realized by means of a transmission, for example, in accordance with the claims, by means of a spindle.

Up till now, the arrangement has been described to comprise only a single-file operation, i.e., that packages are delivered in a single row and are only passed on in a single row.

However, the customers also desire that a double-file distribution can be realized by the arrangement in accordance with one aspect of the invention.

This object is realized, in accordance with the claims, thereby that two pairs of guide rails are provided for gripper elements that are disposed in mirror-image configuration with respect to one another.

Packages that are delivered in a single row are alternatingly, by way of this variant of the arrangement, orientated or, respectively distributed by the one pair of guide rails and by the other pair of guide rails.

In accordance with the claims, there is provided for this that successive carrier rods are respectively associated to a different pair of guide rails.

In this, the guide pins of the grippers are disposed in such a way that, for example, the first, third, fifth or, respectively, each uneven-numbered gripper either moves in a straight path or delivers the package to the left, while the second, fourth or, respectively, each even-numbered gripper also moves in a straight path or, however, distributes the package to the right.

The main advantages of the arrangement in accordance with the invention may be summarized as follows:

compact structure, i.e., rotation and distribution can be carried out simultaneously, handling with permanent contact of the package during the steps of rotation and distribution, and free positioning of the packages with single-file and double-file capability.

A further major advantage of the arrangement in accordance with one aspect of the present invention is the feature of reversibility thereof. That is, for example, packages delivered in two rows can be received at the rear end of the arrangement and can be gathered so as to be disposed in single-file. As a continuation hereof, there is provided that also in the case of a delivery in three rows, an output delivery transport in double-file arrangement, in consideration of the option of rotation, can be realized.

The above-discussed embodiments of the present invention will be described further hereinbelow. When the word "invention" is used in this specification, the word "invention" includes "inventions", that is the plural of "invention". By stating "invention", the Applicants do not in any way admit that the present application does not include more than one patentably and non-obviously distinct invention, and maintains that this application may include more than one patentably and non-obviously distinct invention. The Applicants hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying drawings.

FIG. 2 shows the arrangement according to FIG. 1 in a top plan view;

FIG. 3 shows the arrangement according to FIGS. 1 and 2 in a side elevation;

DESCRIPTION OF THE PREFERRED EMBODIMENTS

Figure 1:
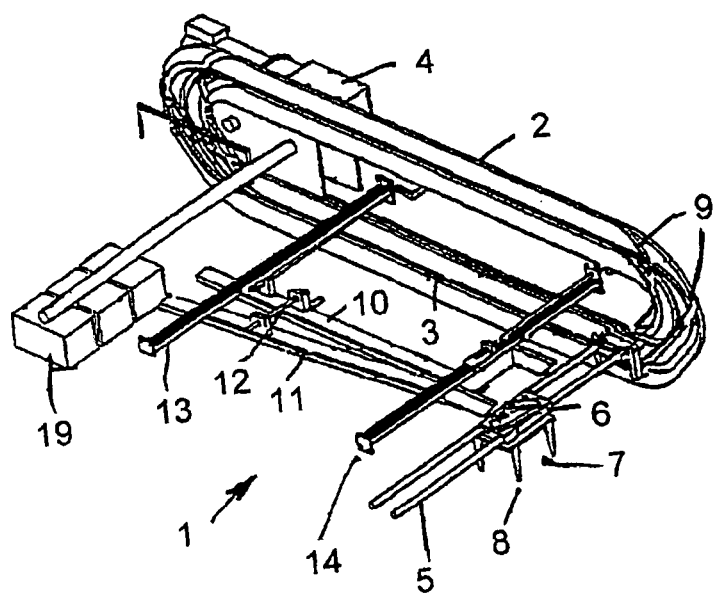
FIG. 1 illustrates in perspective illustration the arrangement in accordance with one embodiment of the invention, in partial presentation.
Figure 4:
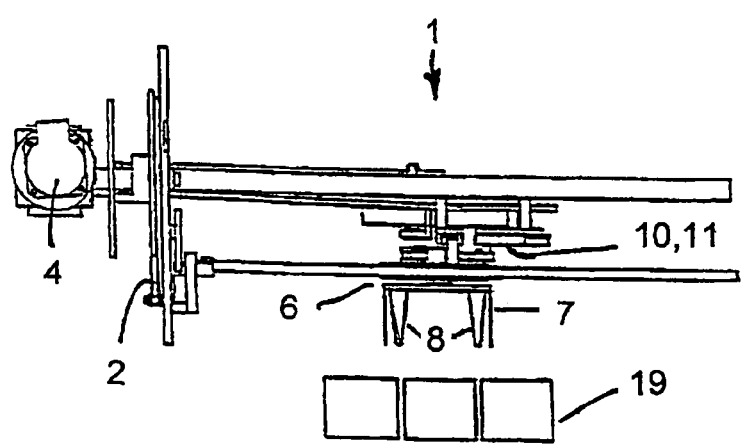
FIG. 4 shows the arrangement according to FIGS. 1 to 3 in a front elevation, this FIG. 4 appears on the sheet with FIG. 1.

In the following with reference to FIG. 1A, this figure generally illustrates a bottling plant with a rinser 101 or cleaning station to which the containers, namely bottles B, are fed in the direction indicated by the arrow A1 by means of a conveyer line 103, and downstream of which, in the direction of travel, the rinsed bottles B are transported by means of a conveyer line 104 formed by a star-wheel conveyer to a filling machine 105 or its inlet star-wheel conveyer. Downstream of the filling machine 105, in the direction of travel of the bottles B, there can preferably be a closer 106 which closes the bottles B. The closer 106 can be connected directly to a labelling device or station 108 by means of a conveyer line 107 formed by a plurality of star-wheel conveyers. In the illustrated embodiment, the labelling device 108 has three outputs, namely one output formed by a conveyer 109 for bottles B which are filled with a first product, from product mixer 123 through conduit 121 and are then labelled corresponding to this product, a second output formed by a conveyer 110 for those bottles B which are filled with a second product from product mixer 124 through conduit 122 and are then labelled corresponding to this product, and a third output formed by a conveyer 111 which removes any bottles B which have been incorrectly labelled.

Figure 1A:
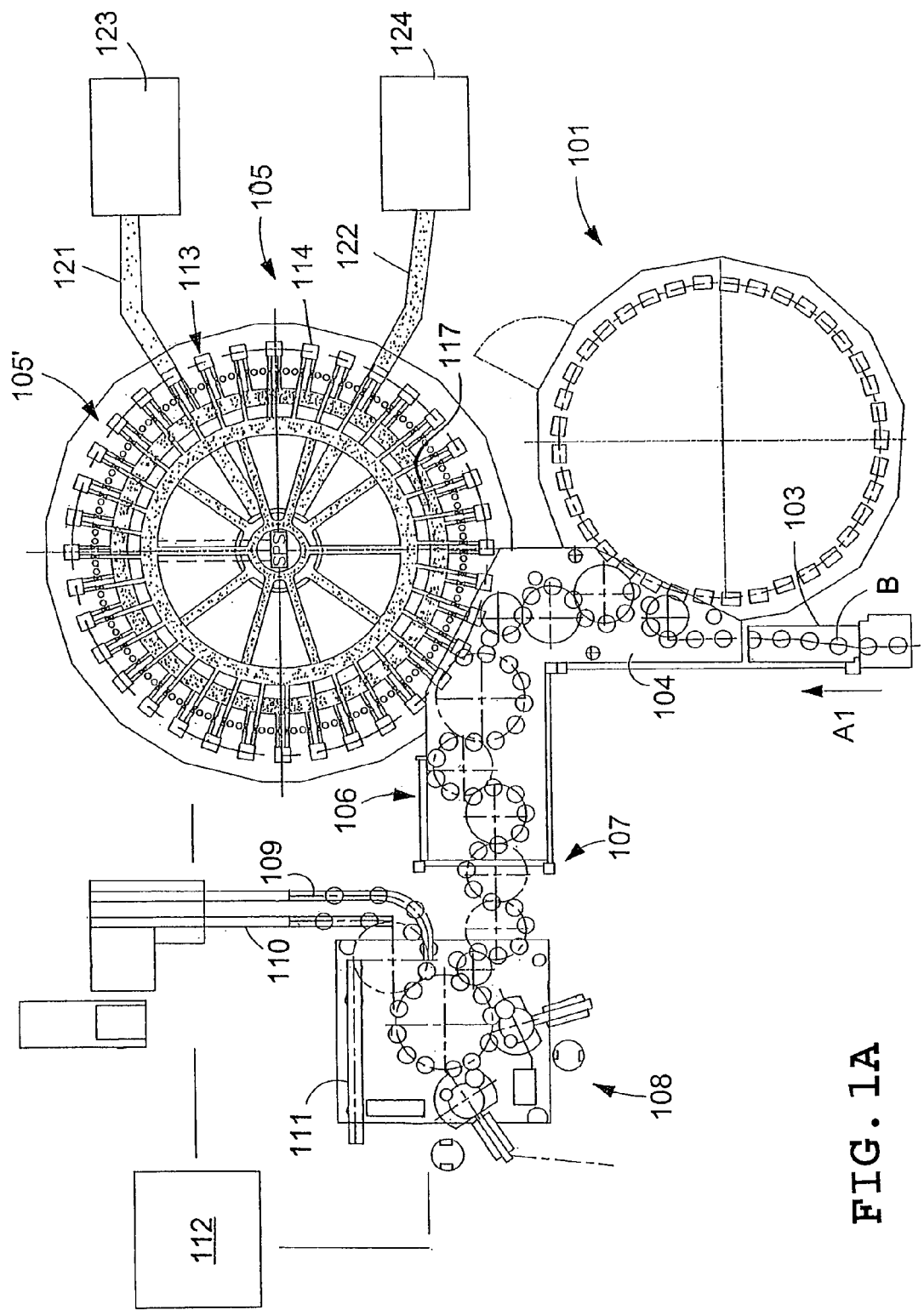
FIG. 1A is a schematic illustration of a bottling plant plant in accordance with one embodiment of the present invention.

In FIG. 1A, 112 is a central control unit or, expressed differently, controller or system which includes a process controller which, among other things, controls the operation of the above-referenced system.

The filling machine 105 is possibly of the revolving design, with a rotor 105' which revolves around a vertical machine axis. On the periphery of the rotor 105' there are a number of filling positions 113, each of which consists of bottle carriers or container carriers, as well as a filling element or filling device 114 located above the corresponding container carrier. The toroidal vessel 117 is a component of the revolving rotor 105'. The toroidal vessel 117 can be connected by means of a rotary coupling and by means of an external connecting line 121 to an external reservoir or mixer 123 to supply the product, that is, product mix from reservoir 123, for example.

As well as the more typical filling machines having one toroidal vessel, it is possible that in at least one possible embodiment of the present invention, a filling machine could possibly be utilized wherein each filling element or filling device 114 is preferably connected by means of two connections to a toroidal vessel 117 which contains a first product (by means of a first connection, for example, 121) and to a second toroidal vessel which contains a second product (by means of the second connection, for example, 122). In this case, each filling element 114 can also preferably have, at the connections, two individually-controllable fluid or control valves, so that in each bottle B which is delivered at the inlet of the filling machine 105 to a filling position 113, the first product or the second product can be filled by means of an appropriate control of the filling product or fluid valves.

It will be understood that while a two-product assembly is illustrated in FIG. 1A, that the invention is equally applicable to single-product installations, or other commensurate embodiments.

Figure 1B:
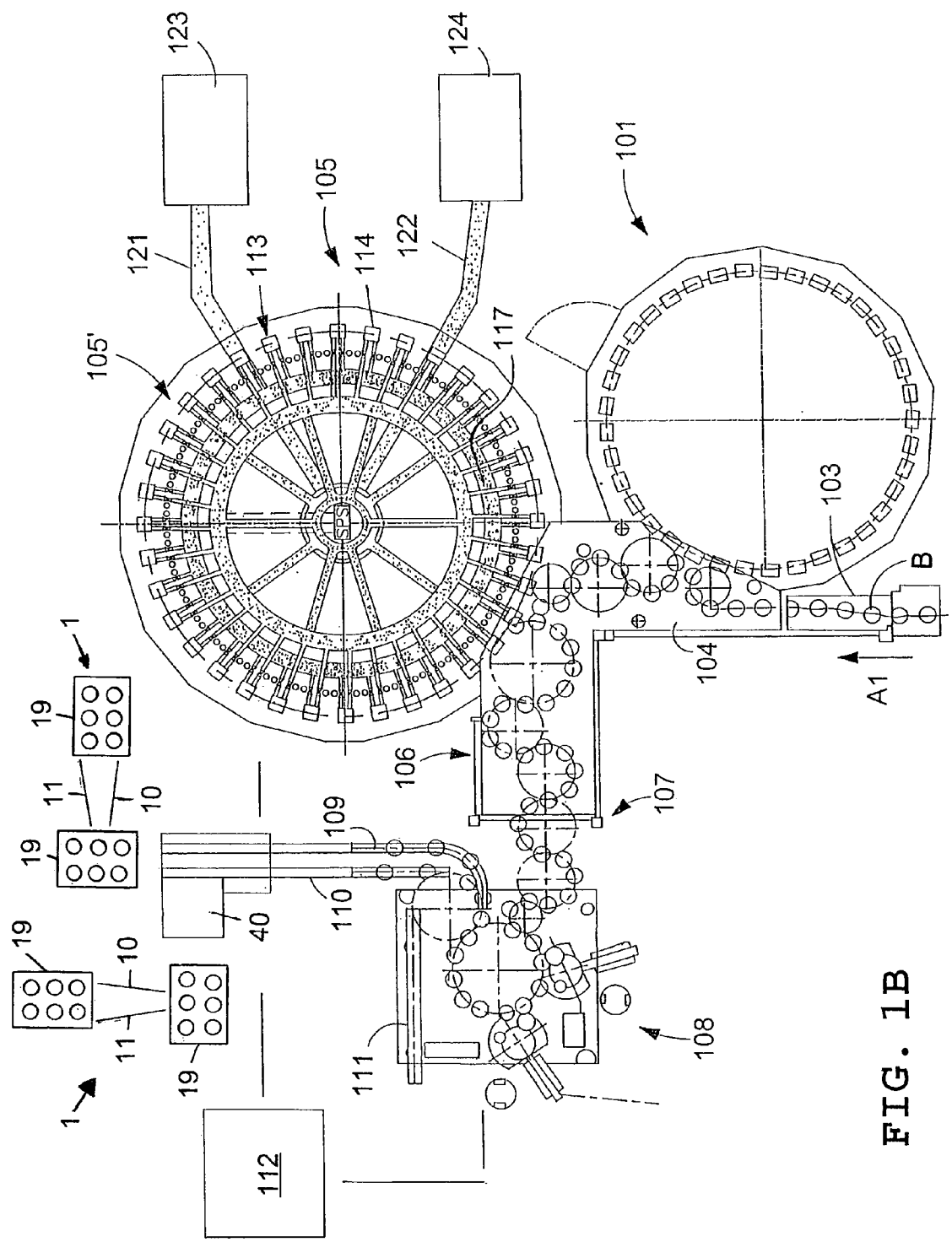
FIG. 1B is a schematic illustration of a bottling plant plant in accordance with one embodiment of the invention and showing a conveyer arrangement for rotating packages.

FIG. 1B illustrates a bottling plant substantially similar to the embodiment of FIG. 1A. In FIG. 1B a location 40 is configured to place bottles B in packages or containers 19. The containers 19 are then rotated or turned by conveyer arrangements 1 that are described in greater detail with reference to FIGS. 1 to 4.

Thus, in FIGS. 1 to 4, the arrangement in accordance with the invention is illustrated with its essential components and is generally identified by reference numeral 1. For reasons of clarity, a lateral guide structure is omitted.

The arrangement comprises conveyer element frames 2, that are disposed to the left and the right at a transport band that is not shown in further detail, in which respectively a continuously circulating chain 3 is guided. Driving motion of the chains is by way of a motor 4 that is connected to the chains 3; carrier rods 5 are connected to the chains, with only one being shown for reasons of clarity. The carrier rod 5 is composed of two rails that are disposed parallel with respect to one another, and a sled structure 6, or slide, is disposed in such a way on said rails so as to be capable of being moved in the longitudinal direction of the rails. A gripper element 7 is disposed at the sled structure 6, this gripper element 7 being directed in downward direction towards the transport band and it is capable of rotation about a vertical axis. The gripper element 7 has fingers 8 at its four corner points.

The carrier rods 5 comprise two guide pins at the ends, which are horizontally off-set to a minor extent with respect to one another. The guide pins are guided in guide paths or guide structures 9 that extend in such a way that the horizontal orientation of the carrier rods 5 and, consequently, of the gripper element 7, is maintained during each circulation or cycle.

Two guide rails 10 and 11 are disposed above the transport plane and they are stationary with respect to the conveyer element frames 2, with the corresponding guide groove being directed towards the transport plane. The guide rails 10 and 11 are configured to be moved, by means of a manually actuatable spindle 12, from a position in which they are disposed parallel with respect to one another, into a position in which they are spread from one another and embrace an angle having the magnitude a. A further spindle drive 13 provides that the guide rail pair 10, 11, as a unit, can be swung about the point of intersection of the guide rails 10 and 11.

A further spindle 14 can be provided that can serve to vary the position of this point of intersection or point of rotation.

A guide pin 15 is provided on the sled structure 6, as well as a joint point or linkage point 16, this linkage point being provided by the axis of rotation of the gripper elements 7 and at this linkage point 16 is then connected a lever system 17, this being embodied by a thrust crank or slider-crank mechanism. The free end of the toggle lever 18 also has a guide pin.

The guide pin 15 is associated with the guide rail 10 and the guide pin 18 is associated with the guide rail 11.

The drawing illustrates the condition wherein the sled structure 6, having approached in an inclined path from above, has entered into the feed-in region of the packages 19. The fingers 8 of the gripper element 7 grasp the package 19 in positive manner and transport them further beneath the guide rails 10, 11. During this event, the guide pins 15 and 18 are moved in the associated guide rails 10, 11. In the shown example, the guide pins 15 and 18, due to the magnitude of angle α, are drawn away from one another, this causing the provision of force of torque by the lever system 17 to the gripper 7, such that the gripper 7, the gripper element 7, and the package 19 that has been grasped, are rotated about an angle that is of a magnitude in conformity with the magnitude of angle α. During this, the forward movement of the package 19 is parallel with respect to the direction of transportation.

By way of swinging of the pair of guide rails 10, 11, swinging being effectuated by means of spindle 13, there can be effectuated in the just described process also a distribution, that is, a lateral shifting of the package 19.

When the pair of guide rails 10, 11 is doubled in mirror image fashion and by provision of each second carrier rod 5 to the respectively same guide rail pair 10, 11, it is feasible to realize a two-file delivery or output from a single-file input.

With the aid of the just illustrated arrangement also the opposite case can be accomplished, namely, the distribution or, respectively, the gathering, while simultaneously rotating the package, in the reverse direction, can be carried out, such that a multiple-file product stream or input stream can be converted into a single-file output stream.

Figure 5:
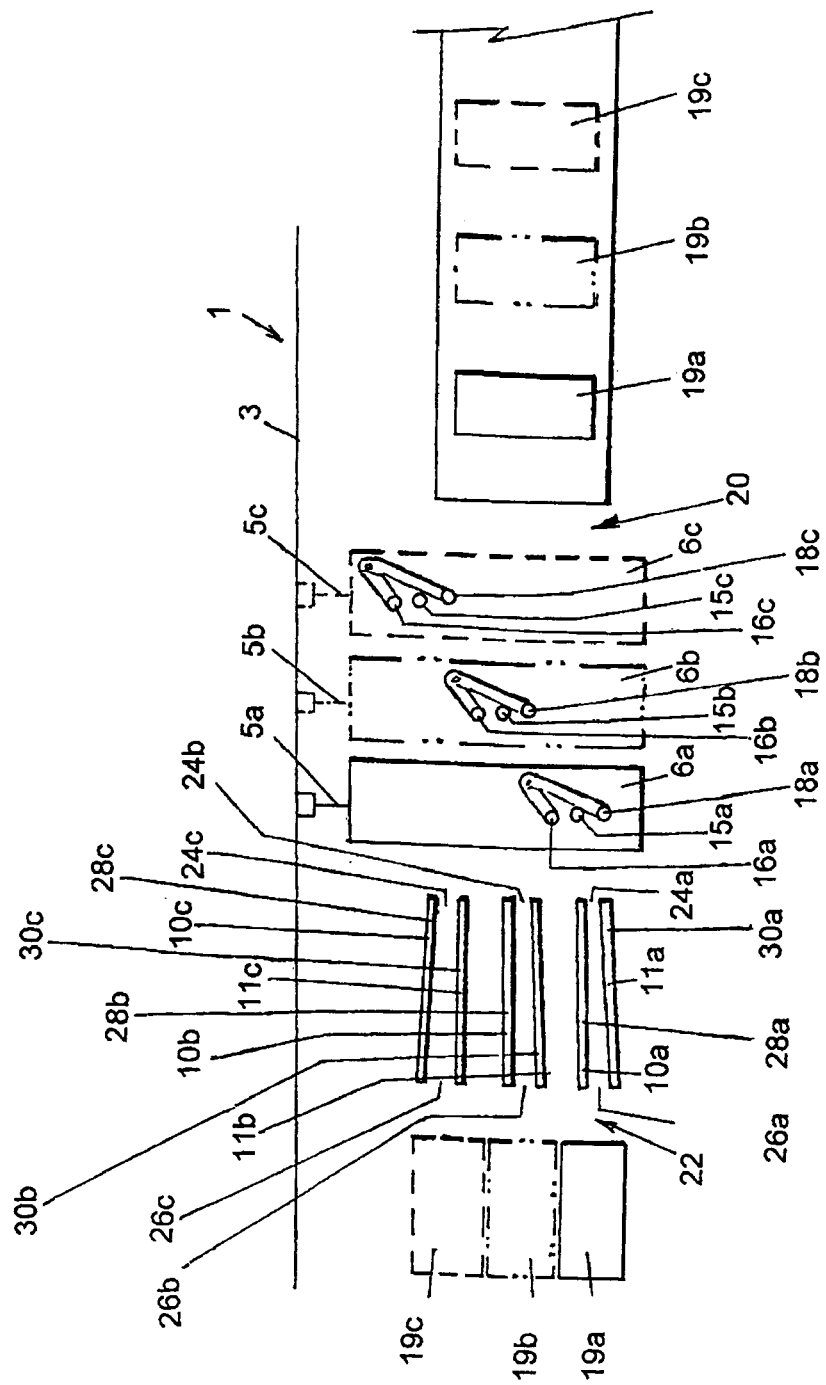
FIG. 5 illustrates in a schematic representation the handling of containers with positioning of three containers at the conveyer output in accordance with one embodiment of the invention.

With reference to FIG. 5, it is suggested that the containers, 19a, 19b, 19c, etc., arrive at the conveyer input end 20, on the right hand side in FIG. 5, of the arrangement 1 in a single-file sequence and the containers, 19a, 19b, 19c, always arrive in the same attitude and at the same input location 20 for the arrangement 1.

It is further suggested that three pairs of guide rails, 10a, 11a; 10b, 11b, 10c, 11c, extend longitudinally from the input ends, 24a, 24b, 24c, thereof, on the right hand side in FIG. 5, to the output ends, 26a, 26b, 26c, thereof, on the left hand side in FIG. 5, of the arrangement 1. In other words, the output end 26a, left hand side in FIG. 5, of the first pair of guide rails 10a, 11a is disposed to deliver the first container 19a to a first location at the output end 22 of the arrangement 1. The output end 26b of the second pair of guide rails 10b, 11b is disposed to deliver the second container 19b to a second, different, position alongside the first container 19a. The output end 26c of the third pair of guide rails 10c, 1c is disposed to deliver the third container 19c to a third, yet different, location alongside the second container 19b to arrive at the arrangement of three containers, 19a, 19b, 19c, along one another as is illustrated in FIG. 5.

The arrangement 1 illustrated in FIG. 5 comprises three sleds, 6a, 6b, 6c, each with guide pins 15a, 15b, 15c, as well as joint points or linkage points 16a, 16b, 16c, and guide or toggle pins 18a, 18b, 18c. The sleds, 6a, 6b, 6c, are connected to the chain 3 by means of carrier rods, 5a, 5b, 5c. The position of each sled, 6a, 6b, 6c, can be moved on its carrier rod, 5a, 5b, 5c.

The operation of the arrangement in accordance with FIG. 5 is as follows.

The first sled 6a grips the first container 19a at the input end 20 of the arrangement 1. The first sled 6a delivers the first container 19a to the input end 24a of the first pair of guide rails 10a, 11a that guide the sled 6a along the path provided by the first pair of guide rails 10a, 11a. The guide pin 15a of the first sled 6a engages the groove 28a in the guide rail 10a. The guide pin 18a of the first sled 6a engages the groove 30a in the guide rail 11a. At the output end 22 of the arrangement 1, the first container 19a is deposited upon release from the first sled 6a. The second sled 6b grips the second container 19b at the input end 20 of the arrangement 1.

The second sled 6b delivers the second container 19b to the input end 24b of the second pair of guide rails 10b, 11b that guide the second sled 6b along the path provided by the second pair of guide rails 10b, 11b. The guide pin 15b engages the groove 28b in the guide rail 10b. The guide pin 18b of the second sled 6b engages the groove 30b in the guide rail 1b. At the output end 22 of the arrangement 1, the second container 19b is deposited alongside the first container 19a upon release from the second sled 6b.

The third sled 6c grips the third container 19c at the input end 20 of the arrangement 1. The third sled 6c delivers the third container 19c to the input end 24c of the third pair of guide rails 10c, 11c that guides the third sled 6c along the path provided by the third pair of guide rails 10c, 11c. The guide pin 15c engages the groove 28c in the guide rail 10c. The guide pin 18c engages in the groove 30c in guide rail 11c. At the output end 22 of the arrangement 1, the third container 19c is deposited alongside the second container 19b upon release from the third sled 6c.

The first group of three containers, 19a, 19b, 19c, is then removed to make room for the next group of three containers.

The foregoing cycle is repeated for the following containers 19 at the input end of the arrangement.

Turning of the containers 19 while the sleds, 6a, 6b, 6c, move along the pairs of guide rails, 10a, 11a; 10b, 11b; 10c, 11c, is accomplished by each set of guide rails, 10a, 11a; 10b, 11b; 10c, 11c, being disposed at an angle α.

It is further suggested by the example shown in FIG. 5 that the first sled 6a has the guide pin 15a located at a first position so as to align the guide pin 15a with the first guide rail 10a of the first pair of guide rails 10a, 11a. The second sled 6b has the guide pin 15b located at a second, different, position so as to align the guide pin 15b with the first guide rail 10b of the second pair of guide rails 10b, 11b. The third sled 6c has the guide pin 15c located at a third, yet different, position so as to align the guide pin 15c with the first guide rail 10c of the third pair of guide rails 10c, 11c. In other words, there are three different locations for the guide pins, 15a, 15b, 15c, on the three sleds, 6a, 6b, 6c.

It is also suggested in FIG. 5 that the guide pins, 15a, 15b, 15c, and the guide or toggle pins, 18a, 18b, 18c, are modified and displaced. Thus, the guide pin 15a is aligned with the guide rail 10a. The guide pin 15b is aligned with the guide rail 10b. The guide pin 15c is aligned with the guide rail 10c. The toggle pin 18a is aligned with the guide rail 11a. The toggle pin 18b is aligned with the guide rail 11b. The toggle pin 18c is aligned with the guide rail 11c.

Figure 6:
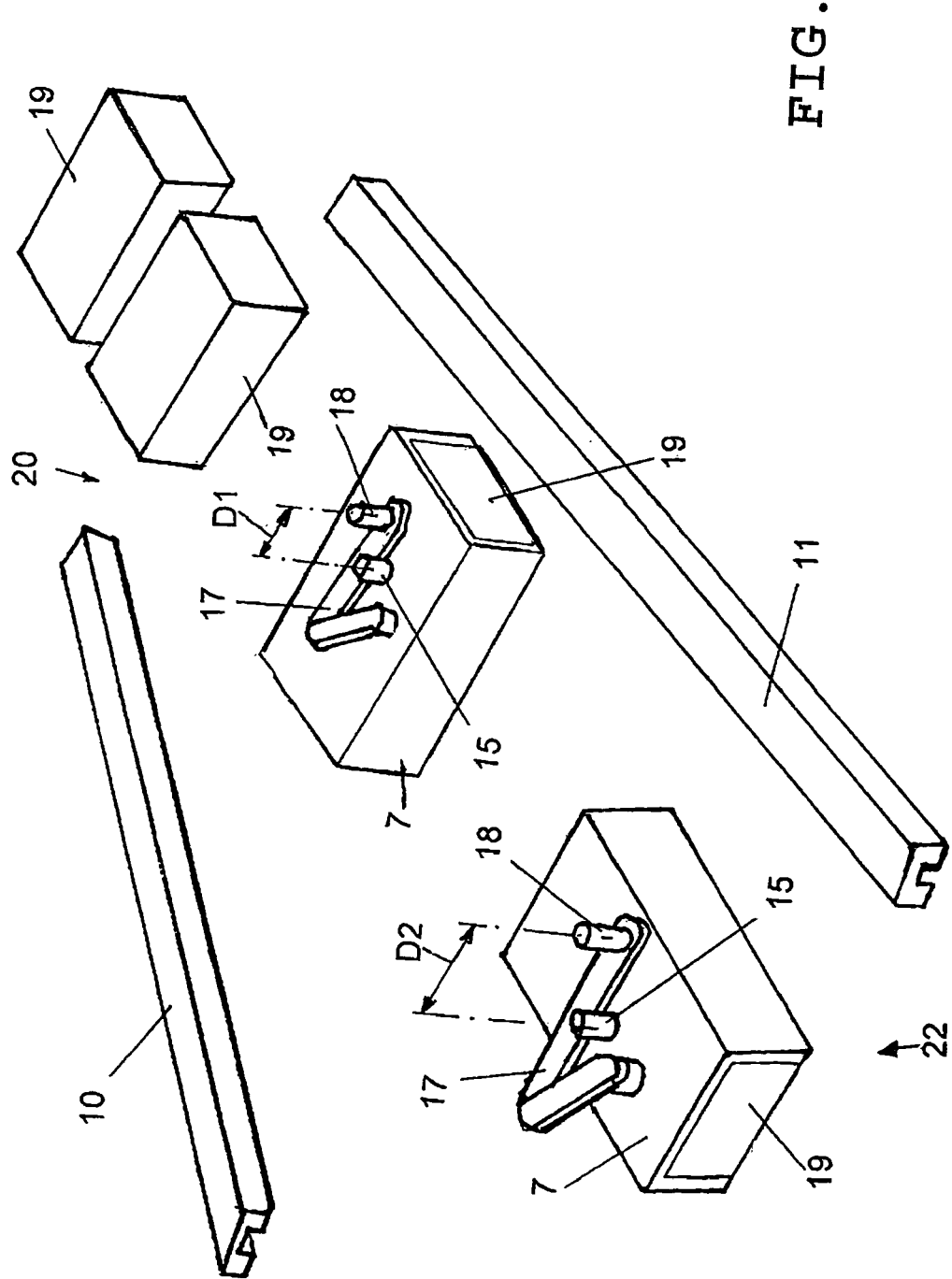
FIG. 6 is a partial perspective view showing the position of packages at the conveyer arrangement in accordance with one embodiment of the invention.

FIG. 6 illustrates the rotation of a package or container 19 from the a first position at the conveyer input 20 to a second, rotated or turned position at the conveyer output 22. This is accomplished by the guide pin 18 of lever system 17 and the guide pin 15 of a guide box structure 7 being displaced from distance D1 to distance D2 upon movement in the guide rails 10, 11 from the conveyer input 20 to the conveyer output 22. It will be appreciated that a reset will be employed, such as, a spring, to reset the lever system from the position D2 to the position D1.

Figure 6A:
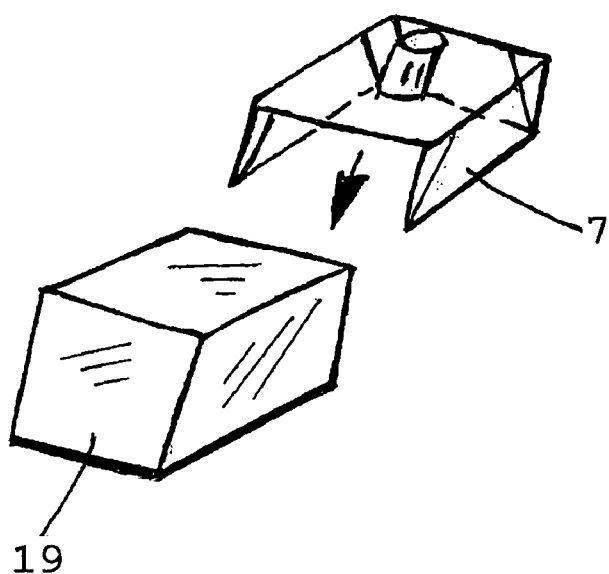
FIG. 6A is a perspective view of a guide box structure approaching a package for transport.

FIG. 6A illustrates the guide box structure 7 moving in downward direction towards a package 19 at the conveyer input 20.

Figure 7:
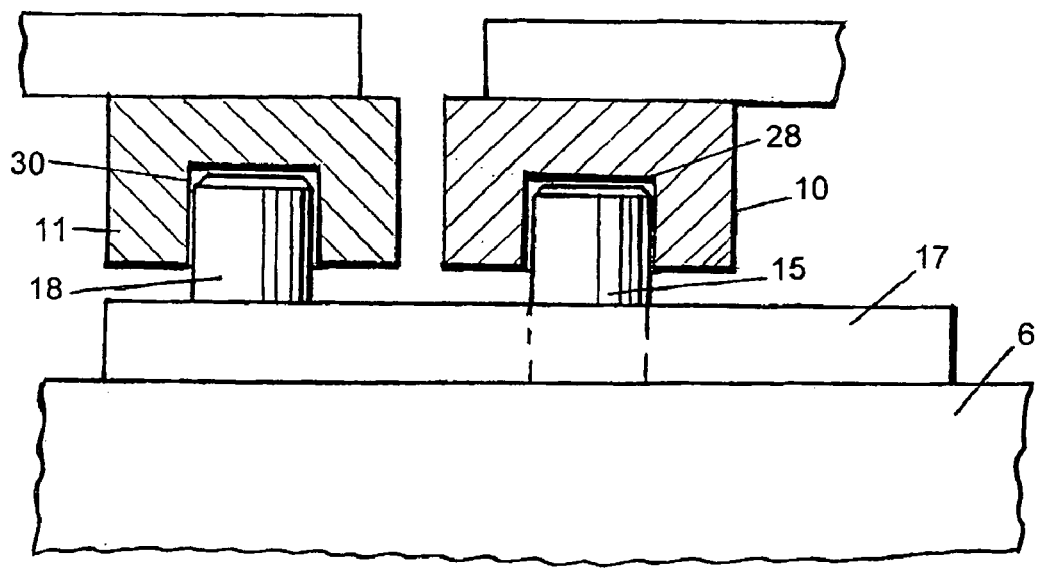
FIG. 7 is a detail view showing the engagement of guide pins at the guide rails in accordance with one embodiment of the invention.

FIG. 7 shows a portion a sled 6 and a portion of lever system 17. Guide pin structure 15 is part of sled 6. Guide pin 15 is engaged in groove 28 of guide rail 10. Similarly, guide pin 18 which is part of lever system 17 is engaged in groove 30 of guide rail 11 upon movement of sled 6 from the conveyer input 20 to conveyer output 22.

One feature of the invention resides broadly in an arrangement for aligning and distributing of items, particularly items that have a rectangular configuration, that are delivered in at least one row and that have a uniform distance between one another, characterized in that a plurality of carrier rods 5 that are connected to conveying elements 3 that are continuously circulating in frames 2 disposed laterally along the delivered items, at which carrier rods is disposed and journalled for rotation about a vertical axis 16 respectively at least one gripper element 7 that can be moved in sliding motion along the carrier rod 5 by means of a sled structure 6, which gripper element 7 is guided in guide rails 10, 11 that are disposed stationary in relation to the conveyer element frame, with provision that the guide rails can be brought from a position in which they are disposed parallel with respect to one another, into an opened position in which they are disposed at an acute angle with respect to one another, and together they can be swung in a direction transversely with respect to the transport direction about the apex of this angle.

Another feature of the invention resides broadly in an arrangement characterized in that the conveying elements comprise chains.

Yet another feature of the invention resides broadly in an arrangement characterized in that the carrier rods 5 are guided in guides 9 that are disposed in the conveyer element frames 2, in such a way that the carrier rods 5, and, consequently, the gripper elements 7 that are disposed thereat, are always disposed in the same orientation parallel with respect to the transport plane.

Still another feature of the invention resides broadly in an arrangement characterized in that the gripper element 7 that is guided by means of a lever system 17, of which one end 18 is guided in the one guide rail 11, and the other is connected at the gripper element 7, and in the other guide rail 10 there is guided a guide pin 15 that is rigidly connected to the sled structure 6, as a function of the angle of opening of the guide rails 10, 11, is rotatable through an angle of from zero degree to more than ninety degrees.

A further feature of the invention resides broadly in an arrangement characterized in that the lever system 17 comprises a thrust crank.

Another feature of the invention resides broadly in an arrangement characterized in that the magnitude of the angle of opening of the guide rails 10, 11 for the gripper elements 7 is adjustable by means of a transmission 12.

Yet another feature of the invention resides broadly in an arrangement characterized therein that the transmission 12 comprises a spindle-and-spindle-nut transmission.

Still another feature of the invention resides broadly in an arrangement characterized in that the transmission 12 is manually actuatable.

A further feature of the invention resides broadly in an arrangement characterized in that the transmission 12 is actuatable by a motor.

Another feature of the invention resides broadly in an arrangement characterized therein that the swinging movement of the guide rails 10, 11 for the gripper elements 7 is carried out by means of a spindle 13 that is disposed transversely with respect to the transport direction.

Yet another feature of the invention resides broadly in an arrangement characterized in that two guide rail pairs 10, 11 for gripper elements 7 are provided, which are disposed in mirror-image arrangement with respect to one another.

Still another feature of the invention resides broadly in an arrangement characterized therein that successive carrier rods 5 are respectively associated with one differing guide rail pair 10, 11.

The components disclosed in the various publications, disclosed or incorporated by reference herein, may be used in the embodiments of the present invention, as well as equivalents thereof.

It is to be understood that any degrees of angles listed herein are examples of the dimensions that may be utilized in at least one embodiment according to the present invention. It is to be further understood that one skilled in the art to which the present invention most nearly pertains would be able to modify any or all of the above dimensions in at least one embodiment of the present invention.

For example, in at least one embodiment of the present invention, the angle α between guide rail 10 and guide rail 11 is in the range of from about zero degree to about 90 degrees or more. Such range can possibly include increments of at least about 1 degree, that is the range includes at least 0 degree, 1 degree, 2 degrees, 3 degrees and so forth to 90 degrees, 91 degrees, 92 degrees, and 93 degrees. It will be appreciated that smaller increments are included within the range and that the limits of the range may vary.

Thus, the invention relates, in one aspect, to an arrangement for aligning and distributing of items, particularly items that have a rectangular configuration, that are delivered in at least one row and that have a uniform distance between one another.

The appended drawings in their entirety, including all dimensions, proportions and/or shapes in at least one embodiment of the invention, are accurate and are hereby included by reference into this specification.

What is claimed is:

1. A beverage bottling plant for filling bottles with a liquid beverage filling material, said beverage bottling plant comprising:

a beverage filling machine comprising a plurality of beverage filling positions, each beverage filling position comprising a beverage filling device for filling bottles with liquid beverage filling material;

said filling devices comprising apparatus configured to introduce a predetermined flow of liquid beverage filling material into the interior of bottles to a substantially predetermined level of liquid beverage filling material;

said apparatus configured to introduce a predetermined flow of liquid beverage filling material comprising apparatus configured to terminate the filling of beverage bottles upon liquid beverage filling material reaching said substantially predetermined level in bottles;

a first conveyer arrangement configured and disposed to move bottles to said beverage filling machine;

a closing station configured to close filled bottles;

a second conveyer arrangement configured and disposed to transfer filled bottles from said filling machine to said closing station;

a loading station configured to load filled bottles into containers;

a third conveyor arrangement configured and disposed to transfer filled bottles from said closing station to said loading station;

a fourth conveyer arrangement configured and disposed to remove the containers containing filled bottles from said loading station; said fourth conveyer arrangement comprising:

a conveyer input and a conveyer output;

a conveyer frame;

a chain configured and disposed to cycle in said frame between said conveyer input and said conveyer output;

a first guide rod, a second guide rod, and a third guide rod, all being connected to said chain;

a first sled structure connected to said chain by said first guide rod at a first location and configured to travel with said chain and also configured to move along said first guide rod;

a second sled structure connected to said chain by said second guide rod at a second location and configured to travel with said chain interiorly of said first sled structure and also configured to move along said second guide rod;

a third sled structure connected to said chain by said third guide rod at a third location and configured to travel with said chain interiorly of said second sled structure and also configured to move along said third guide rod;

each sled structure comprising:

a guide structure configured to receive and at least partially to surround a container containing filled bottles at said conveyer input and configured to deposit the container containing filled bottles at said conveyer output;

a first guide pin connected to said guide structure;

a toggle-lever arrangement;

said toggle-lever arrangement comprising:

a linkage pin connected to said guide structure;

said linkage pin having an axis of rotation;

said guide structure configured to rotate about said axis of rotation of said linkage pin;

a first lever having a first end and a second end remote from said first end of said first lever;

said first end of said first lever being connected to said linkage pin and configured to rotate said linkage pin about said longitudinal axis of said linkage pin and thus to effectuate rotation of said guide structure and the container containing filled bottles;

a second lever configured and disposed to actuate said first lever for the rotation of said guide structure;

said second lever having a first end and a second end remote from said first end;

said first end of said second lever connected to said second end of said first lever;

said second lever having a guide pin connected to said second end of said second lever;

said first guide pin and said guide pin of said second lever configured to be disposed in a first position, at a first distance from one another, adjacent said conveyer input; and said first guide pin and said guide pin of said second lever configured to be disposed at a second position, at a second distance from one another, adjacent said conveyer output;

said second distance being greater than said first distance and of sufficient length to effectuate the rotation of said guide structure and the container containing filled bottles upon said first lever being actuated by said second lever; and said toggle-lever arrangement further comprising:

a reset arrangement configured and disposed to reposition said first guide pin and said guide pin of said second lever of said toggle-lever arrangement from the second position at said conveyer output to the first position at said conveyer input;

said fourth conveyer arrangement further comprising:

a first pair of guide rails configured and disposed to guide said first sled structure and a first container containing filled bottles to a first location;

a second pair of guide rails disposed adjacent said first pair of guide rails and configured and disposed to guide said second sled structure and a second container containing filled bottles to a second location adjacent said first location;

a third pair of guide rails disposed adjacent said second pair of guide rails and configured and disposed to guide said third sled structure and a third container containing filled bottles to a third location adjacent said second location;

said each pair of guide rails disposed stationary in reference to said conveyer frame and said each pair of guide rails comprising:

a first guide rail having a guide groove to guide said first guide pin; and a second guide rail having a guide groove to guide said guide pin of said second lever of a toggle-lever arrangement;

said each guide rail comprising an input end disposed adjacent said conveyer in put;

said each guide rail comprising an output end disposed adjacent said conveyer output;

said each first guide rail configured to guide the first guide pin of the corresponding sled structure in the corresponding first guide rail guide groove;

said each second guide rail configured to guide the guide pin of the second lever of the corresponding toggle-lever arrangement of the corresponding sled structure in said second guide rail guide groove in the corresponding first guide rail guide groove;

said each pair of guide rails thus configured to guide the corresponding guide structure and the container containing filled bottles from said conveyer input to a location at said conveyer output;

said each pair of guide rails further comprising:

a first apparatus configured and disposed to position said first guide rail and said second guide rail in a first position with respect to one another and also in a second position with respect to one another:

wherein in said first position said first guide rail and said second guide rail are disposed parallel with respect to one another to permit movement of said guide structure and the container containing filled bottles without rotation from said conveyer input to said conveyer output; and wherein in said second position said first guide rail and said second guide rail are positioned at a predetermined angle with respect to one another and thus to dispose the input ends of said each pair of guide rails with respect to one another at the first distance between the first guide pin and the guide pin of the second lever of the corresponding toggle-lever arrangement and also to dispose the output ends of said each pair of guide rails with respect to one another at the second distance between the first guide pin and the guide pin of the second lever of the corresponding toggle-lever arrangement;

said angle between said each pair of guide rails, the first guide pin of the corresponding sled structure, and the guide pin of the second lever of the corresponding toggle-lever arrangement of the corresponding sled structure configured to effectuate the rotating of the guide structure and the container containing filled bottles upon transport of the corresponding sled structure and the container containing filled bottles from said conveyer input to said conveyer output; and said each pair of guide rails yet further comprising:

a second apparatus configured and disposed to position the output ends of said pair of guide rails at a predetermined distance with reference to said conveyer chain.

2. The beverage bottling plant according to claim 1, wherein:

said conveyer frame comprises the guide structures configured and disposed to guide said first guide rod, said second guide rod, and said third guide rod in a predetermined plane.

3. The beverage bottling plant according to claim 2, wherein:

said first guide rail and said second guide rail are disposed at an angle between about zero degrees to about ninety degrees to rotate the guide structure and the container held by the guide structure.

4. The beverage bottling plant according to claim 3, wherein:

said toggle-lever arrangement comprises a thrust crank configured and disposed to rotate the guide structure and the container containing filled bottles held by the guide structure.

5. The beverage bottling plant according to claim 4, wherein:

said first apparatus configured and disposed to position said first guide rail and said second guide rail in a first position and also in a second position with respect to one another, comprises a transmission arrangement configured and disposed to vary the magnitude of the angle between said first guide rail and said second guide rail;

said transmission arrangement for varying the angle between said first guide rail and said second guide rail comprises one of (i), (ii) and (iii), wherein (i), (ii) and (iii) comprise:

(i) a spindle-and-spindle-nut transmission arrangement;

(ii) a transmission arrangement configured to be manually actuated; and (iii) a transmission arrangement comprising a motor configured and disposed to actuate said transmission arrangement comprising a motor.

6. The beverage bottling plant according to claim 5, wherein:

said second apparatus configured and disposed to position the output ends of the pair of guide rails at a predetermined distance with reference to said conveyer chain comprises a spindle structure disposed transversely with respect to said first guide rail and said second guide rail.

7. A conveyer arrangement configured to transport packages, said conveyer arrangement comprising:

a conveyer input and a conveyer output;

a conveyer frame;

a plurality of conveying devices configured and disposed to cycle in said conveyer frame between said conveyer input and said conveyer output;

a plurality of guide rods; each of said guide rods being connected to said conveying devices and configured to travel with said conveying devices;

a plurality of sled structures; each of said sled structures configured to move along the corresponding guide rod;

each of said sled structures comprising:

guide structure configured to receive a package at said conveyer input and configured to deposit the package at said conveyer output;

an arrangement configured and disposed to rotate said guide structure;

said conveyer arrangement further comprising:

a plurality of pairs of guide rails disposed stationary with respect to said conveyer frame and configured to guide one of said plurality of guide structures and the package held by the corresponding guide structure from said conveyer input to said conveyer output and to deposit packages adjacent one another in a row transverse to said conveyer frame at said conveyer output;

each of said pairs of guide rails comprising:

a first guide rail and a second guide rail; and an apparatus configured and disposed to position said first guide rail and said second guide rail in a first position with respect to one another and also in a second position with respect to one another:

wherein in said first position said first guide rail and said second guide rail are disposed parallel with respect to one another to permit movement of one of said plurality of guide structures and the package held by the corresponding guide structure without being rotated by said rotating arrangement upon movement of the corresponding guide structure and the package from said conveyer input to said conveyer output; and wherein in said second position said first guide rail and said second guide rail are disposed at an angle with respect to one another to permit rotating of one of said plurality of guide structures and the package held by the corresponding guide structure by said rotating arrangement upon movement of the corresponding guide structure and the package from said conveyer input to said conveyer output.

8. The conveyer arrangement according to claim 7, comprising all of: (a), (b), (c), (d), (e), (f), (g), (h), (i), (j) and (k), wherein (a), (b), (c), (d), (e), (f), (g), (h), (i), (j), and (k) comprise:

(a) said plurality of conveying devices comprises a chain configured and disposed to guide said plurality of guide rods;

(b) said conveyer frame comprises guide structures configured and disposed to guide said plurality of guide rods in a predetermined plane;

(c) said first guide rail and said second guide rail are disposed at an angle between about zero degrees to about ninety degrees to rotate the guide structure and the package held by the guide structure;

(d) said rotating arrangement comprises a thrust crank configured and disposed to rotate the guide structure and the package held by the guide structure;

(e) a transmission arrangement configured and disposed to vary the magnitude of the angle between said first guide rail and said second guide rail;

(f) said transmission arrangement for varying the angle between said first guide rail and said second guide rail comprises a spindle-and-spindle-nut transmission arrangement;

(g) said transmission arrangement comprises one of (i) and (ii), wherein (i) and (ii) comprise:

(i) a transmission arrangement configured to be manually actuated; and (ii) a transmission arrangement comprising a motor configured and disposed to actuate said transmission arrangement comprising a motor;

(h) an apparatus configured and disposed to swing said first guide rail and also said second guide at the ends closest to said conveyer input with reference to said conveyer frame;

(i) said apparatus configured and disposed to swing said first guide rail and also said second guide at the ends closest to said conveyer input with reference to said conveyer frame comprises a spindle structure disposed transversely with respect said first guide rail and said second guide rail;

(j) a first guide structure and a second guide structure; and two pairs of guide rails comprising a first pair of guide rails and a second pair of guide rails; said first pair of guide rails and said second pair of guide, rails are disposed in mirror-image arrangement with respect to one another; and (k) a first guide rod of said plurality of guide rods and the first guide box structure and the package held by the first guide structure are configured to be guided by said first pair of said two pairs of guide rails; and a second guide rod of said plurality of guide rods and the second guide structure and the package held by the second guide box structure are configured to be guided by said second pair of said two pairs of guide rails.

9. The conveyer arrangement according to claim 7, comprising at least one of: (a), (b), (c), (d), (e), (f), (g), (h), (i), (j) and (k), wherein (a), (b), (c), (d), (e), (f), (g), (h), (i), (j) and (k) comprise:

(a) said plurality of conveying devices comprises a chain configured and disposed to guide said plurality of guide rods;

(b) said conveyer frame comprises guide structures configured and disposed to guide said plurality of guide rods in a predetermined plane;

(c) said first guide rail and said second guide rail are disposed at an angle between about zero degrees to about ninety degrees to rotate the guide structure and the package held by the guide structure;

(d) said rotating arrangement comprises a thrust crank configured and disposed to rotate the guide structure and the package held by the guide structure;

(e) a transmission arrangement configured and disposed to vary the magnitude of the angle between said first guide rail and said second guide rail;

(f) a transmission arrangement configured and disposed to vary the magnitude of the angle between said first guide rail and said second guide rail; said transmission arrangement for varying the angle between said first guide rail and said second guide rail comprises a spindle-and-spindle-nut transmission arrangement;

(g) a transmission arrangement configured and disposed to vary the magnitude of the angle between said first guide rail and said second guide rail; said transmission arrangement for varying the angle between said first guide rail and said second guide rail comprises a spindle-and-spindle-nut transmission arrangement; said transmission arrangement comprises one of (i) and (ii), wherein (i) and (ii) comprise:

(i) a transmission arrangement configured to be manually actuated; and (ii) a transmission arrangement comprising a motor configured and disposed to actuate said transmission arrangement comprising a motor;

(h) an apparatus configured and disposed to swing said first guide rail and also said second guide at the ends closest to said conveyer input with reference to said conveyer frame;

(i) an apparatus configured and disposed to swing said first guide rail and also said second guide at the ends closest to said conveyer input with reference to said conveyer frame; said apparatus configured and disposed to swing said first guide rail and also said second guide at the ends closest to said conveyer input with reference to said conveyer frame comprises a spindle structure disposed transversely with respect said first guide rail and said second guide rail;

(j) a first guide structure and a second guide structure; and two pairs of guide rails comprising a first pair of guide rails and a second pair of guide rails; said first pair of guide rails and said second pair of guide rails are disposed in mirror-image arrangement with respect to one another; and (k) a first guide rod of said plurality of guide rods and the first guide structure and the package held by the first guide structure are configured to be guided by said first pair of said two pairs of guide rails; and a second guide rod of said plurality of guide rods and the second guide structure and the package held by the second guide structure are configured to be guided by said second pair of said two pairs of guide rails.

10. The conveyer arrangement according to claim 7, comprising:

a third guide rail and a fourth guide rail;

said third guide rail and said fourth guide rail are disposed in mirror-image arrangement with respect to said first guide rail and said second guide rail.

11. The conveyer arrangement according to claim 10, wherein:

the first guide structure and the package held by said first guide structure are configured to be guided by said first guide rail and said second guide rail from said conveyer input to said conveyer output to deposit the package held by said first guide structure at a first location at said conveyer output; and the second guide structure and the package held by said second guide structure are configured to be guided by said third guide rail and said fourth guide rail from said conveyer input to said conveyer output to deposit the package held by said second guide structure at a second location and in a row transverse to said conveyer frame adjacent a package deposited by said first guide structure at said conveyer output.

\* \* \* \* \*

UNITED STATES PATENT AND TRADEMARK OFFICE
CERTIFICATE OF CORRECTION

PATENT NO. : 6,973,767 B2
DATED : December 13, 2005
INVENTOR(S) : Stefan Wagner, Hans-Peter Kuhlmann and Hans-Gerd Ripkens It is certified that error appears in the above-identified patent and that said Letters Patent is hereby corrected as shown below:

Column 10,
Line 60, after "10c", delete "1c" insert -- 11c --.

Column 11,
Line 25, after "rail", delete "1b." insert -- 11b. --.

Column 17,
Line 22, before "guide" insert -- a --.

Column 18,
Line 35, after "guide" (second occurrence) delete ",".

Signed and Sealed this

Twenty-eighth Day of March, 2006

JON W. DUDAS
*Director of the United States Patent and Trademark Office*